United States Patent [19]
Piette

[11] Patent Number: 5,706,714
[45] Date of Patent: Jan. 13, 1998

[54] BRAKE ACTUATING MECHANISM WITH A POWER SPRING ENCLOSURE

[76] Inventor: Michel Piette, 490 des Cèdres, C.P. 956, Ste-Brigide-d'Iberville Québec, Canada, J0J 1X0

[21] Appl. No.: 609,149

[22] Filed: Feb. 29, 1996

[51] Int. Cl.$^6$ ............................................. F01B 7/00
[52] U.S. Cl. ................................. 92/63; 92/130 A
[58] Field of Search .................... 92/63, 62, 130 A

[56] References Cited

U.S. PATENT DOCUMENTS

| | | |
|---|---|---|
| 2,854,954 | 10/1958 | Howze . |
| 3,439,585 | 4/1969 | Herrera ................................ 92/130 A |
| 3,576,152 | 4/1971 | Chevreux . |
| 3,613,515 | 10/1971 | Swandwer et al. . |
| 3,630,093 | 12/1971 | Morse et al. . |
| 3,696,711 | 10/1972 | Berg et al. . |
| 3,782,251 | 1/1974 | Le Marchand . |
| 3,811,365 | 5/1974 | Gordon et al. ............................ 92/63 |
| 3,813,994 | 6/1974 | Swander et al. . |
| 3,842,716 | 10/1974 | Swander . |
| 3,896,706 | 7/1975 | Newstead et al. . |
| 3,911,795 | 10/1975 | Gibbons ................................... 92/63 |
| 3,943,829 | 3/1976 | Newstead et al. . |
| 4,263,840 | 4/1981 | Herrera ................................... 92/63 |
| 4,480,531 | 11/1984 | Mylius et al. . |
| 4,729,290 | 3/1988 | Ewald et al. . |
| 5,311,809 | 5/1994 | Choinski et al. . |
| 5,353,688 | 10/1994 | Pierce et al. . |

FOREIGN PATENT DOCUMENTS

| | | |
|---|---|---|
| 0 871 522 | 5/1971 | Canada . |
| 1921622 | 2/1971 | Germany ................................... 92/63 |
| 2 209 570 | 9/1972 | Germany . |
| 2414051 | 10/1974 | Germany ................................... 92/63 |
| 2 707 957 | 8/1978 | Germany . |
| 0 956 195 | 4/1964 | United Kingdom . |

Primary Examiner—Thomas E. Denion
Attorney, Agent, or Firm—Longacre & White

[57] ABSTRACT

The fluid-operated brake actuating mechanism comprises a casing having a partition wall to divide the casing into upper and lower coaxial chambers. First and second fluid-tight diaphragms are mounted in the upper and lower chambers, respectively. First and second ports enable injection of a pressurized fluid in the cavities delimited in the upper chamber between the first diaphragm and the partition wall and in the lower chamber between the second diaphragm and the partition wall. A coaxial power spring is mounted into an enclosure formed in the upper chamber at the upper end of the casing for limiting axial extension of the power spring upon opening of the casing to access the upper chamber. The upper chamber can therefore be accessed easily and safely upon maintenance of the brake actuating mechanism. Of course, respective axially slidable members transfer axial forces (a) from the power spring to the first diaphragm or from the first diaphragm to the power spring, (b) from either one of the diaphragms to the other diaphragm, and (c) from the second diaphragm to the brake in view of actuating this brake.

14 Claims, 6 Drawing Sheets

BRAKE ACTUATING MECHANISM WITH A POWER SPRING ENCLOSURE

BACKGROUND OF THE INVENTION

1. Field of the Invention

The present invention relates to a brake actuating mechanism. More specifically, the present invention relates to a brake actuating mechanism having a power spring confined into an enclosure for safety purposes.

2. Brief Description of the Prior Art

Air-operated brake actuating mechanisms are widely known and currently used on heavy vehicles such as trucks, buses and the like. These brake actuating mechanisms conventionally comprise a hollow, inverted cup-shaped head, a central flange case and a cup-shaped service housing. The hollow head includes a lower outwardly extending annular flange and the flange case has a top outwardly extending annular flange assembled to the lower flange of the hollow head by means of a first clamping ring to form an upper chamber.

The flange case also has a generally central partition wall and a lower outwardly extending annular flange assembled to an upper outwardly extending annular flange of the service housing through a second clamping ring to form a lower chamber.

Mounted inside the upper chamber is a piston and a power spring interposed between that piston and the top wall of the hollow head.

Mounted inside the upper chamber is also a first flexible diaphragm having a peripheral portion squeezed between the lower flange of the hollow head and the upper flange of the flange case. This first diaphragm also has a central portion interposed between the piston and a first push rod end plate.

A first push rod extends through the partition wall and slides into a bushing through an air-tight toric joint. The upper end of the first push rod is secured to the first push rod end plate, while the lower end of this first push rod is secured to a second push rod end plate lying in the lower chamber. A spring having the general configuration of a conical helix is mounted in the upper chamber between the first push rod end plate and the partition wall.

A first port enables injection of pressurized air into the upper chamber between the cavity delimited between the first diaphragm and the partition wall.

The service housing has a bottom wall through which a second push rod extends. The upper end of the second push rod is fixedly secured to a third push rod end plate lying in the lower chamber. A second flexible diaphragm has a central portion interposed between the second and third push rod end plates. This second diaphragm has a peripheral portion squeezed between the lower flange of the flange case and the upper flange of the service housing.

A second spring having the general configuration of a conical helix is mounted between the third push rod end plate and the bottom wall of the service housing.

A second port enables injection of pressurized air into the lower chamber between the second diaphragm and the partition wall of the flange case.

The parts most frequently replaced are the two diaphragms and the toric joint. To reach the second diaphragm, the service housing must be removed from the flange case by dismantling the second clamping ring. This operation is safe and usually easy since the spring constant of the second spring is relatively low.

To reach the first diaphragm and the toric joint, the flange case must be removed from the hollow head by dismantling the first clamping ring. Dismantlement of the first clamping ring will cause extension of the power spring and, therefore, release of the high energy level stored in that power spring. In the past, this operation has caused serious, even fatal accidents.

To overcome this drawback, the manufacturers have developed a model of brake actuating mechanism in which the flange case cannot be dismantled from the hollow head. An example of such brake actuating mechanism is described and illustrated in U.S. Pat. No. 5,311,809 (Choinski et al.) issued on May 17, 1994.

Although this new model of air-operated brake actuating mechanism has eliminated the accidents related to removal of the flange case from the hollow head, it presents the drawback of increasing the maintenance costs. Presently, the cost of a diaphragm is about $ 3.00 CAN and the cost of a toric joint about $ 0.25 CAN. With the new model of air-operated brake actuating mechanism, not only the first diaphragm and the toric joint but also the hollow head, the flange case, the power spring, the piston, the first push rod plate, the first push rod has to be replace to substantially increase the maintenance costs.

This new model of air-operated brake actuating mechanism also has the drawback of increasing the quantity of raw materials (steel, aluminium, rubber) which is disposed of. Moreover, the problems related to dismantlement of the upper chamber containing the power spring still persists since the different materials (steel, aluminium, rubber) must be sorted out upon recycling these materials. Therefore, danger is still present.

A further drawback of the prior art air-operated brake actuating mechanisms is that although the upper end of the power spring is centered by the tapered upper end of the hollow head, the lower end of that power spring is located on the first piston itself applied to the first flexible diaphragm whereby lateral deviation of the first push rod is enabled upon up/down movement thereof. This often results into a premature wear of both the toric joint and associated bushing.

A still further problem related to the prior art air-operated brake actuating mechanisms is that upon breaking of the power spring, that power spring is susceptible to contact and perforate the first diaphragm. The air leakage caused by the perforation prevents complete retraction of the second push rod to cause continuous rubbing of the brake pads. This may cause major damages to the brake components and even breaking down of the vehicle.

OBJECT OF THE INVENTION

The main object of the present invention is therefore to provide an improved brake actuating mechanism free of the above discussed drawbacks of the prior art.

SUMMARY OF THE INVENTION

More specifically, in accordance with the present invention, there is provided a fluid-operated mechanism for actuating a brake, comprising:

- a casing having a longitudinal axis, a first end, a second end, an inner partition wall to divide the casing into first and second coaxial chambers situated adjacent to the first and second ends, respectively, and means for opening the casing to access the first chamber;
- first and second fluid-tight wall means mounted axially movable in the first and second chambers, respectively, and being spring-biased toward the first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

a power spring enclosure formed in the first chamber at the first end for limiting axial extension of the power spring upon opening of the casing to access the first chamber;

a first axially slidable member for transferring an axial force from the power spring to the first wall means or an axial force from the first wall means to the power spring;

a second axially slidable member passing through the partition wall for transferring an axial force from the first to the second wall means or an axial force from the second to the first wall means;

a fluid-tight joint mounted between the second axially slidable member and the partition wall; and a third axially slidable member passing through the second end of the casing for transmitting an axial force from the second wall means to the brake in view of actuating the brake.

As the power spring is confined into an enclosure for limiting axial extension of this power spring, the casing can be safely opened to access the first chamber since release of the high energy level stored in the power spring is controlled.

In accordance with a preferred embodiment of the fluid-operated mechanism, the first and second ends are upper and lower ends of the casing, and the casing comprises:

an inverted cup-shaped hollow head having a top wall and a lower outwardly extending annular flange;

a flange case having the partition wall and upper and lower outwardly extending annular flanges;

a cup-shaped service housing having an upper outwardly extending annular flange and a bottom wall;

a first clamping ring for assembling the lower flange of the hollow head with the upper flange of the flange case to thereby form the first chamber; and a second clamping ring for assembling the lower flange of the flange case with the upper flange of the service housing to thereby form the second chamber.

According to another preferred embodiment, the power spring enclosure is formed in the first chamber by an additional wall mounted in the hollow head generally perpendicular to the longitudinal axis of the casing. The peripheral portion of the additional wall may be welded to the inner wall surface of the hollow head. Alternatively, the hollow head has an inner wall surface formed with a coaxial groove, and a snap-ring is inserted in the coaxial groove. Then, the peripheral portion of the additional wall rests onto the upper face of the snap-ring.

In accordance with a further preferred embodiment of the fluid-operated mechanism according to the invention, the first and second ends are upper and lower ends of the casing, and the casing comprises:

an inverted cup-shaped hollow head having a top wall and a lower annular edge surface;

an additional wall generally perpendicular to the longitudinal axis of the casing and fixedly secured to the lower annular edge surface of the hollow head to form in the hollow head the power spring enclosure, the additional wall having a peripheral portion forming an outwardly extending annular flange;

a flange case having the partition wall and upper and lower outwardly extending annular flanges;

a cup-shaped service housing having an upper outwardly extending annular flange and a bottom wall;

a first clamping ring for assembling the outwardly extending annular flange formed by the peripheral portion of the additional wall to thereby form the first chamber; and a second clamping ring for assembling the lower flange of the flange case with the upper flange of the service housing to thereby form the second chamber.

The present invention also relates to a fluid-operated mechanism for actuating a brake, comprising:

a casing having a longitudinal axis, a first end, a second end, an inner partition wall to divide the casing into first and second coaxial chambers situated adjacent to the first and second ends, respectively, and means for opening the casing to access the first chamber;

first and second fluid-tight wall means being mounted axially movable in the first and second chambers, respectively, and being spring-biased toward the first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

a power spring enclosure formed in the first chamber at the first end for limiting axial extension of the power spring upon opening of the casing to access the first chamber, the power spring enclosure comprising a first axially slidable member for transferring an axial force from the power spring to the first wall means or an axial force from the first wall means to the power spring;

a second axially slidable member passing through the inner partition wall for transferring an axial force from the first to the second wall means or an axial force from the second to the first wall means;

a fluid-tight joint between the second axially slidable member and the partition wall; and a third axially slidable member passing through the second end of the casing for transmitting an axial force from the second wall means to the brake in view of actuating the brake.

In accordance with preferred embodiments:

the first and second ends are upper and lower ends of the casing;

the casing comprises (a) an inverted cup-shaped hollow head having a top wall and a lower outwardly extending annular flange, (b) a flange case having the partition wall and upper and lower outwardly extending annular flanges, (c) a cup-shaped service housing having an upper outwardly extending annular flange and a bottom wall, (d) a first clamping ring for assembling the lower flange of the hollow head with the upper flange of the flange case to thereby form the first chamber, and (e) a second clamping ring for assembling the lower flange of the flange case with the upper flange of the service housing to thereby form the second chamber;

the power spring enclosure comprises an upper inverted cup-shaped element and a lower cup-shaped element sliding in each other, and means for limiting sliding movement of the upper and lower cup-shaped elements in each other;

the upper cup-shaped element has a top wall fastened to a lower face of the top wall of the hollow head, and the lower cup-shaped element constitutes the first axially slidable member and has a bottom wall having an upper face for receiving the lower end of the power spring and a bottom face resting on an upper face of the first wall means; and one of the upper and lower cup-shaped element slides in the other of the upper and lower cup-shaped elements, and the means for limiting sliding movement of the upper and lower cup-shaped elements in each other comprises (a) an end of said other cup-shaped element formed with an inwardly extending annular flange, and (b) an end of said one cup-shaped element formed with an outer annular protuberance cooperating with the inwardly extending annular flange for limiting sliding movement of said one cup-shaped element in said other cup-shaped element.

The objects, advantages and other features of the present invention will become more apparent upon reading of the following non restrictive description of preferred embodiments thereof, given by way of example only with reference to the accompanying drawings.

DETAILED DESCRIPTION OF THE PREFERRED EMBODIMENTS

In the different Figures of the drawings, the corresponding elements are identified by the same reference numerals.

Figure 1:
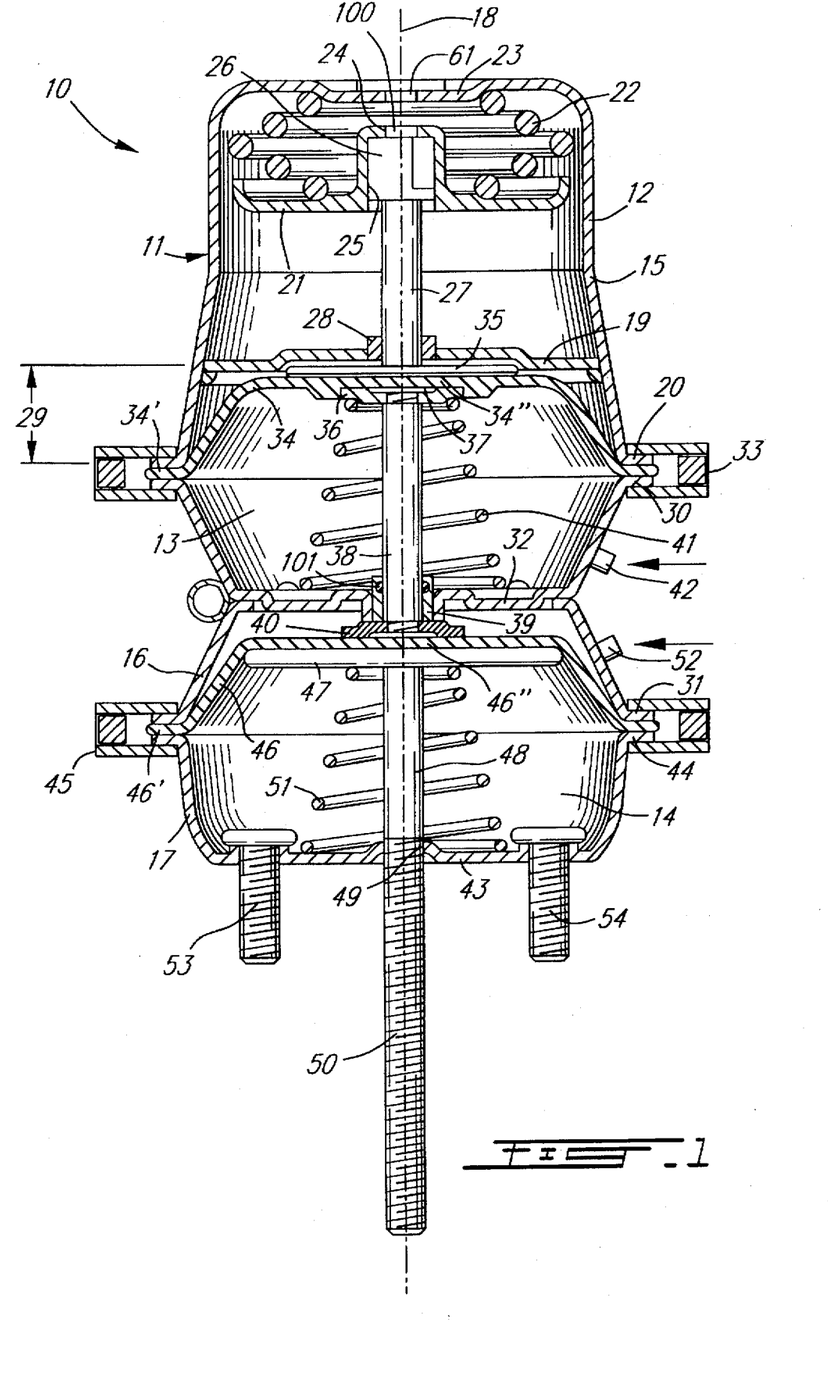
FIG. 1 is a front elevational, cross sectional view of a first embodiment of fluid-operated brake actuating mechanism according to the present invention, in a first position in which the power spring is compressed.

The first embodiment of fluid-operated brake actuating mechanism is generally identified by the reference 10 in FIG. 1 of the appended drawings.

The brake actuating mechanism 10 comprises a casing 11 having an inner partition wall 32 to divide the casing 11 into upper 13 and lower 14 coaxial chambers situated adjacent the upper and lower ends of the casing 11, respectively. More specifically, the casing 11 comprises an inverted cup-shaped hollow head 15, a flange case 16 and a cup-shaped service housing 17. The hollow head 15, flange case 16 and service housing 17 are coaxial about the longitudinal axis 18 of the casing and are generally circular in horizontal cross section.

The hollow head 15 has a top wall 23 and a lower outwardly extending annular flange 20. An additional circular wall 19, generally perpendicular to the longitudinal axis 18, is mounted in the hollow head 15 to form in the upper chamber 13 and at the upper end of the casing an enclosure 12 for a power spring 22.

Figure 2:
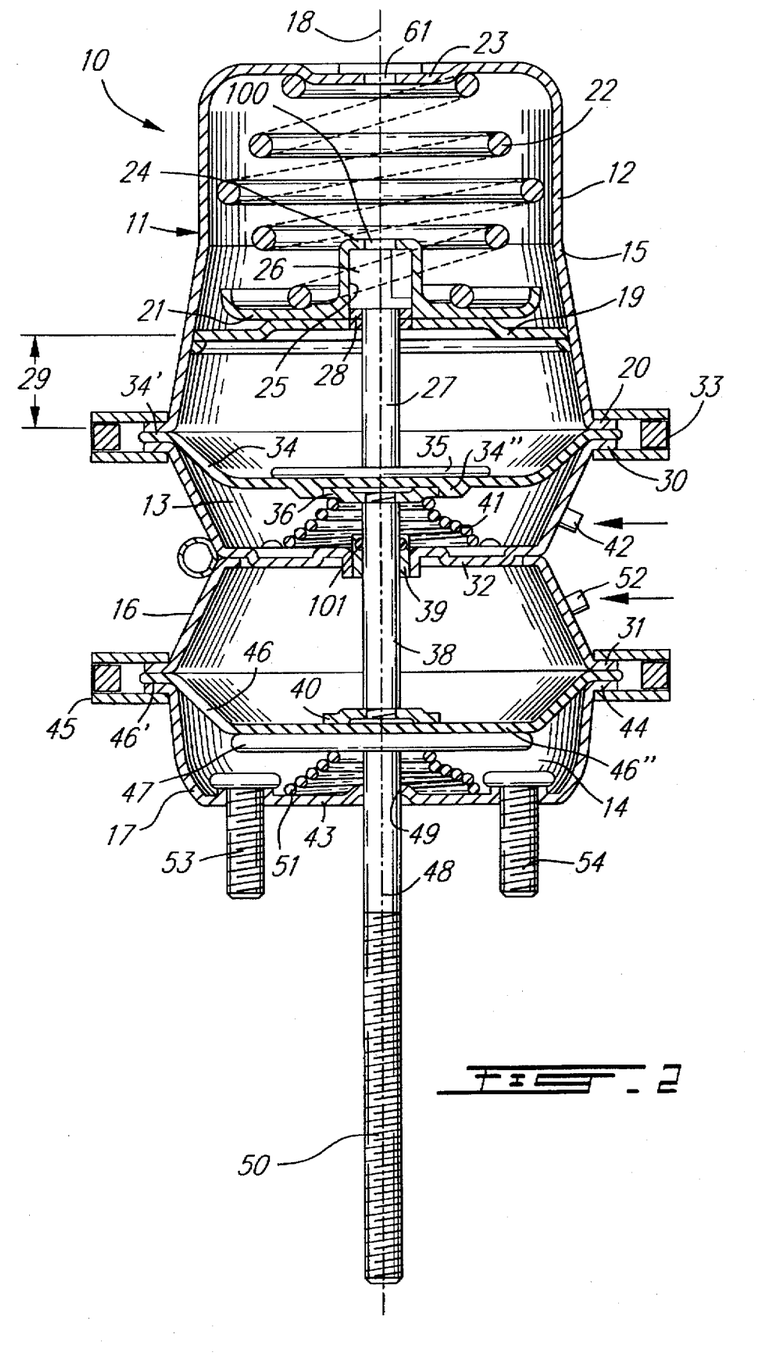
FIG. 2 is a front elevational, cross sectional view of the first embodiment of fluid-operated brake actuating mechanism as illustrated in FIG. 1, in a second position in which the power spring is extended.
Figure 3:
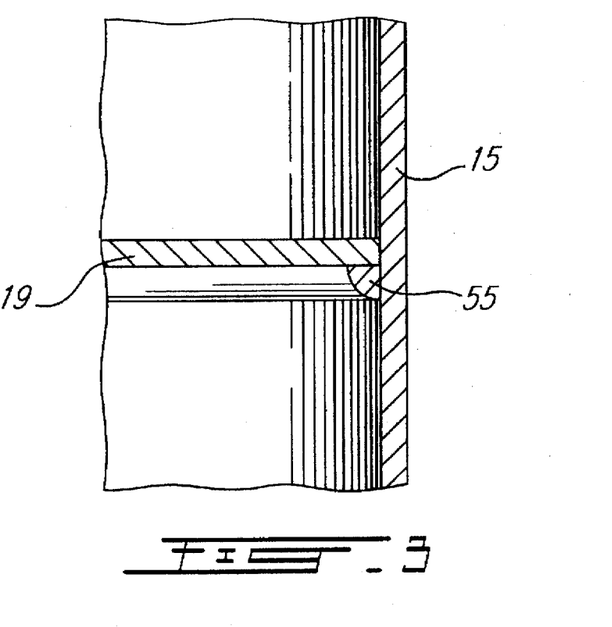
FIG. 3 illustrates a portion of the brake actuating mechanism of FIG. 1 showing a method for enclosing the power spring.

As illustrated in FIGS. 1–3, the peripheral portion of the additional wall 19 can be welded (at 55) to the inner wall surface of the hollow head 15. Also, the lower outwardly extending annular flange 20 is vertically spaced apart from the additional wall 19 by a distance 29.

Installed coaxially with the axis 18 inside the enclosure 12 is a piston 21 and the power spring 22 interposed between the piston 21 and the top wall 23 of the hollow head 15. The piston 21 is formed with a central and axial top cylindrical protuberance 24 to receive the lower end of the power spring 22. The piston 21 is also formed with a central and axial bottom cylindrical cavity 25 in which the upper end 26 of a generally vertical, coaxial and axially slidable push rod 27 is mounted.

The push rod 27 extends through the additional wall 19 and slides into a bushing 28 mounted in a hole of in that wall 19. Secured on the lower end of the push rod 27 is a push rod circular plate member 35 situated on the lower side of the additional wall 19.

Figure 4:
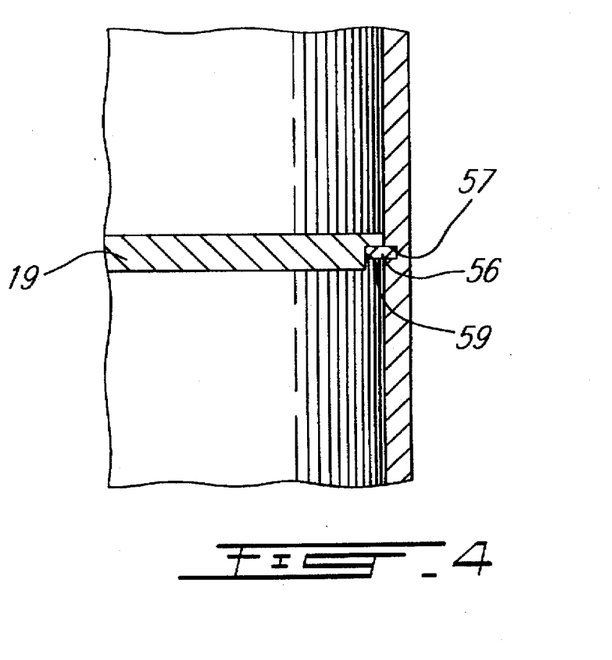
FIG. 4 illustrates an alternate method for enclosing the power spring.

FIG. 4 illustrates another alternative consisting of mounting the additional wall 19 by means of a snap-ring 57 inserted into a coaxial groove 57 formed in the inner wall surface of the hollow head 15. The peripheral portion of the additional wall 19 therefore rests onto the upper face of the snap ring 56.

More specifically, the additional wall 19 is formed with a peripheral right angle corner 59 in which the snap-ring 56 fits. Those of ordinary skill in the art will appreciate that, when the power spring 22 (FIG. 1) is released and applies a force onto the top face of the additional wall 19 to seat the snap-ring 56 into the right angle corner 59, the right angle corner 59 locks the snap-ring 56 into the groove 57. It is then impossible to remove the snap-ring 56.

Although the embodiment of FIG. 4 meets with the main object of the present invention to confine the power spring 22 into an enclosure for safety purposes, it also enable replacement of the power spring 22 by more experienced mechanicians. To remove and replace the snap-ring 56, compression of the power spring 22 is required.

The power spring 22 may be compressed by means of a suitable press applying a sufficient pressure on the lower face of the additional wall 19. Then, the snap-ring 56 can be removed.

Figure 8:
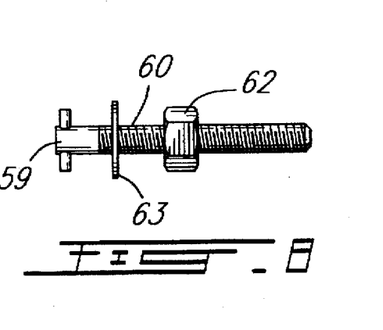
FIG. 8 is an elevational view of a removable mechanical draw screw.

An alternative to compress the power spring 22 is the use of the draw bolt 60 of FIG. 8. The head 59 of the draw bolt 60 is introduced through a hole 61 in the top wall 23 of the hollow head 11 and a hole 100 in the protuberance 24, and is engaged with the upper end 26 of the push rod 27 (FIG. 1). The nut 62 (FIG. 8) can then be screwed to draw the push rod 27 along with the piston 21 upwardly and thereby compress the power spring 22. Washer 63 (FIG. 8) is then situated between the nut 62 and the top wall 23 of the hollow head 15. The additional wall 19 can then be pushed upwardly to allow the mechanician to remove the snap-ring 56.

The flange case 16 has a top outwardly extending annular flange 30, a bottom outwardly extending annular flange 31, and the inner partition wall 32 substantially perpendicular to the geometrical axis 18.

The peripheral flanges 20 and 30 are assembled together by means of a clamping ring 33 to form the chamber 13. Those of ordinary skill in the art will appreciate that the clamping ring 33 and the flanges 20 and 30 enable opening of the casing 11 to access the chamber 13.

Mounted inside the chamber 13 is a diaphragm 34 made of a resilient material such as rubber, neoprene, fabric-center reinforced neoprene or the like. The diaphragm 34 has a peripheral portion 34' squeezed between the flanges 20 and 30 so as to form an impervious joint. The diaphragm 34 also has a central portion 34" squeezed between the plate member 35 and another push rod circular plate member 36. As illustrated in FIG. 1, the underside of the central portion 34" of the diaphragm 34 is formed with a cavity 37 to receive the push rod plate member 36.

A second push rod 38, centered on the axis 18, extends through the partition wall 32 and slides axially into a bushing 39 mounted into a hole of the partition wall 32 and provided with a toric joint 101 forming an air-tight joint between the outer surface of the push rod 38 and the inner cylindrical surface of the bushing 39, while allowing sliding of the push rod 38 into the bushing 39. The push rod 38 has an upper end fixedly secured, for example screwed, to the push rod plate member 36, and a lower end fixedly secured, for example screwed, to a push rod circular plate member 40 situated in the chamber 14, on the lower side of the partition wall 32.

A spring 41 having the general configuration of a conical helix is mounted between the push rod plate member 36 and the partition wall 32.

A port 42 enables injection of a pressurized fluid (pressurized air in the illustrated example) in the cavity delimited in the chamber 13 on the lower side of the diaphragm 34, i.e. between the diaphragm 34 and the partition wall 32. As illustrated in FIG. 1, port 42 is easily accessible from the outside of the flange case 16.

The service housing 17 has a bottom wall 43 and a top outwardly extending annular flange 44. The top outwardly extending annular flange 44 of the service housing 17 and the bottom outwardly extending annular flange 31 of the flange case 16 are assembled together by means of a clamping ring 45 to form the chamber 14.

Mounted inside the chamber section 14 is a diaphragm 46 made of a resilient material such as rubber, neoprene, fabric-center reinforced neoprene or the like. The diaphragm 46 has a peripheral portion 46' squeezed between the flanges 31 and 44 so as to form an impervious joint. The diaphragm 46 also has a central portion 46" squeezed between the push rod plate member 40 and another push rod circular plate member 47.

A third axially slidable push rod 48, centered on the axis 18, extends through a central hole 49 in the bottom wall 43. The push rod 48 has an upper end fixedly secured, for example welded, to the push rod plate member 47, and a lower end threaded brake actuator portion 50 through which the brake (not shown) is actuated.

A spring 51 having the general configuration of a conical helix is mounted between the push rod plate member 47 and the bottom wall 43.

A port 52 enables injection of a pressurized fluid (pressurized air in the illustrated example) into the cavity defined in the chamber 14 on the upper side of the diaphragm 46, i.e. between the diaphragm 46 and the partition wall 32. As illustrated in FIG. 1, port 52 is easily accessible from the outside of the flange case 16.

Two conventional mounting bolts 53 and 54 are installed on the bottom wall 43 of the service housing 17 and are used for mounting the brake actuating mechanism 10.

Operation of the brake actuating mechanism 10 will now be described.

As illustrated in FIG. 1, when pressurized air is supplied to the port 42, the air pressure exerted onto the lower face of the diaphragm 34 transfers an axial from the diaphragm 34 to the power spring 22 through the plate member 35, the push rod 27 and the piston 21. In this position, the power spring 22 has a considerable amount of stored or potential energy. Compression of the power spring 22 also enables the spring 41 to push the rod 38 upwardly and the spring 51 to retract the push rod 48 to thereby release the brake (not shown).

When pressurized air is supplied to the port 42, supply of pressurized air to the port 52 will exert an air pressure on the upper face of the diaphragm 46 to push the plate member 47 and the push rod 48 downwardly to thereby transfer an axial force from the diaphragm 46 to the vehicle brake (not shown) in view of actuating this brake.

With the cavity delimited between the diaphragm 46 and the partition wall 32 pressurized or not, release of the air pressure in the cavity between the diaphragm 34 and the partition wall 32 will release the power spring 22. Then, the power spring 22 will push axially and downwardly the push rod 48 through the piston 21, the push rod 27 and the plate member 35 (transfer of an axial force from the power spring to the diaphragm 34), the plate member 36, the push rod 38 and the plate member 40 (transfer of an axial force from the diaphragm 34 to the diaphragm 46), and the plate member 47. When the downward extension of the push rod 48 is caused by the extension of the power spring, the brake actuating mechanism 10 is in the parking or emergency brake state illustrated in FIG. 2 of the appended drawings. In this state, springs 41 and 51 are compressed; it should be understood that the spring constant of power spring 22 is much greater than that of springs 41 and 51 in combination.

Those of ordinary skill in the art will appreciate that (a) vents are provided in the hollow head 15 on the upper side of the diaphragm 34 and in the service housing 17 on the lower side of the diaphragm 46 to enable free up and down movement of these diaphragms 34 and 46, and (b) that the axially slidable member formed by the push rod 38 and the push rod plate members 36 and 40 transfer any axial force from the diaphragm 34 to the diaphragm 46 and from the diaphragm 46 to the diaphragm 34.

The operation of brake actuating mechanisms such as 10 is believed to be otherwise well known to those of ordinary skill in the art and accordingly will not be further described in the present disclosure.

The parts most frequently replaced are the two diaphragms 34 and 46 and the toric joint 101. To reach the diaphragm 46, the service housing 17 must be removed by dismantling the clamping ring 45. This operation is safe and usually causes no problem since the spring constant of the spring 51 is relatively low.

To reach the diaphragm 34 and the toric joint 39, the flange case 16 must be removed by dismantling the clamping ring 33. This operation is also carried out easily and safely because the power spring enclosure 12 will limit the extension of the power spring 22 and control the high force exerted by that spring.

The brake actuating mechanism 10 in accordance with the present invention presents the following advantages:

the clamping rings 33 and 45 can be removed without any danger since the power spring 22 is confined into the enclosure 12 to thereby render the diaphragms 34 and 46 more easily accessible;

the piston 21 is no longer in contact with the diaphragm 34; this piston 21 is connected to the push rod 27 guided by the bushing 28 to thereby prevent, upon up/down movement of the brake actuating mechanism, lateral deviation of the push rod 38 whereby premature wear of the toric joint 101 is reduced;

upon breaking of the power spring 22, the broken power spring 22 cannot reach the diaphragm 34 to perforate that diaphragm;

all the pieces of the head section (hollow head 15, additional wall 19, power spring 22, piston 21, push rod 27, bushing 28 and plate member 36) of the brake actuating mechanism 10 are made of steel whereby no dismantlement of that section upon recycling the metal of the mechanism 10 is required;

the costs of repairing the brake actuating mechanism are lower; and the lifetime of the brake actuating mechanism 10 is greatly extended.

Figure 5:
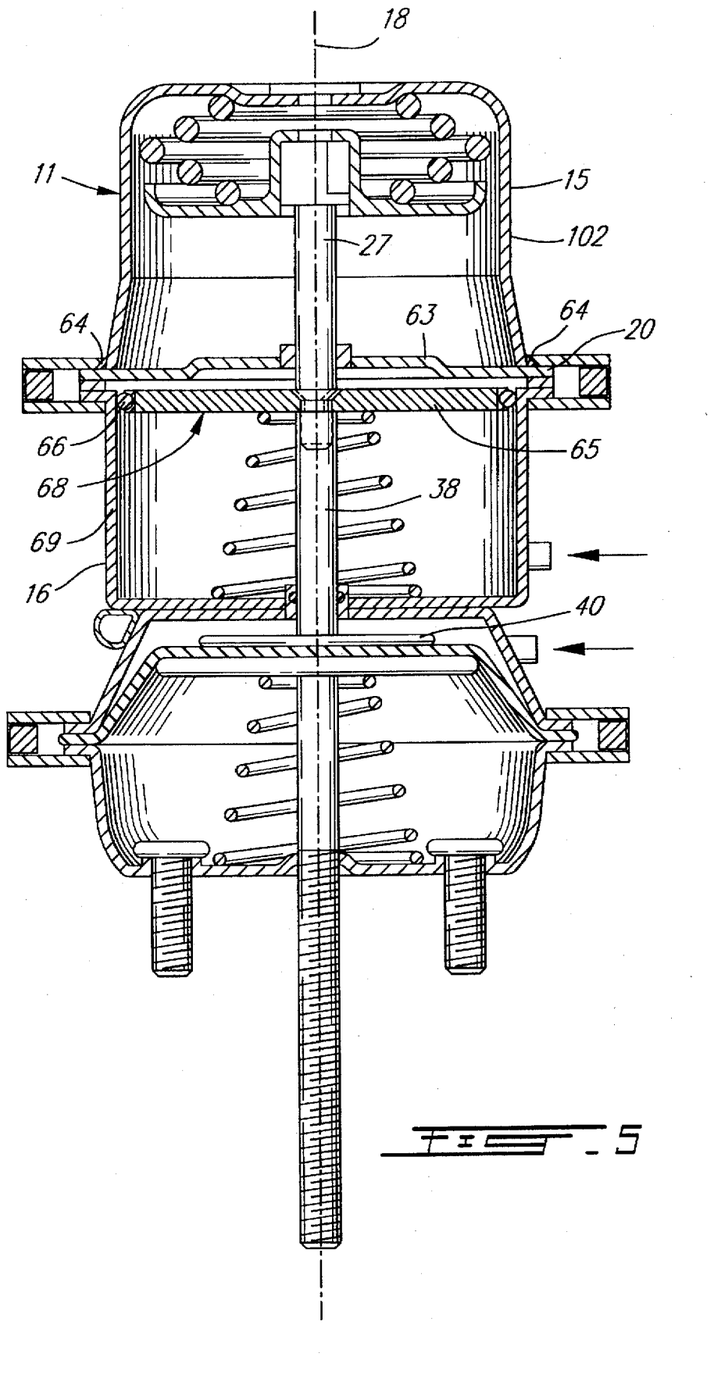
FIG. 5 is a front elevational, cross sectional view of a second embodiment of fluid-operated brake actuating mechanism according to the present invention, in which the power spring is compressed.

In the embodiment of FIG. 5, the inverted cup-shaped hollow head has a lower annular edge surface to which an additional wall 63 is welded (see 64). The additional wall 63 is generally perpendicular to the longitudinal axis 18 of the casing 11 to form in the hollow head 15 a power spring enclosure 102. The additional wall 63 has a peripheral portion which extends outwardly to form the annular flange 20. The lower end of the push rod 27 is screwed directly in the upper end of the push rod 38. A piston 68 is slidably mounted in a cylindrical portion 69 of the flange case 16 to replace the diaphragm 34. More specifically, piston 68 is formed of a circular plate 65 with a peripheral O-ring 66. As illustrated, the circular plate 65 is inserted between the screwed lower end of the push rod 27 and upper end of the push rod 38.

Those of ordinary skill in the art will appreciate that the operation of the embodiment of FIG. 5 is the same as the embodiment of FIGS. 1 and 2.

Figure 6:
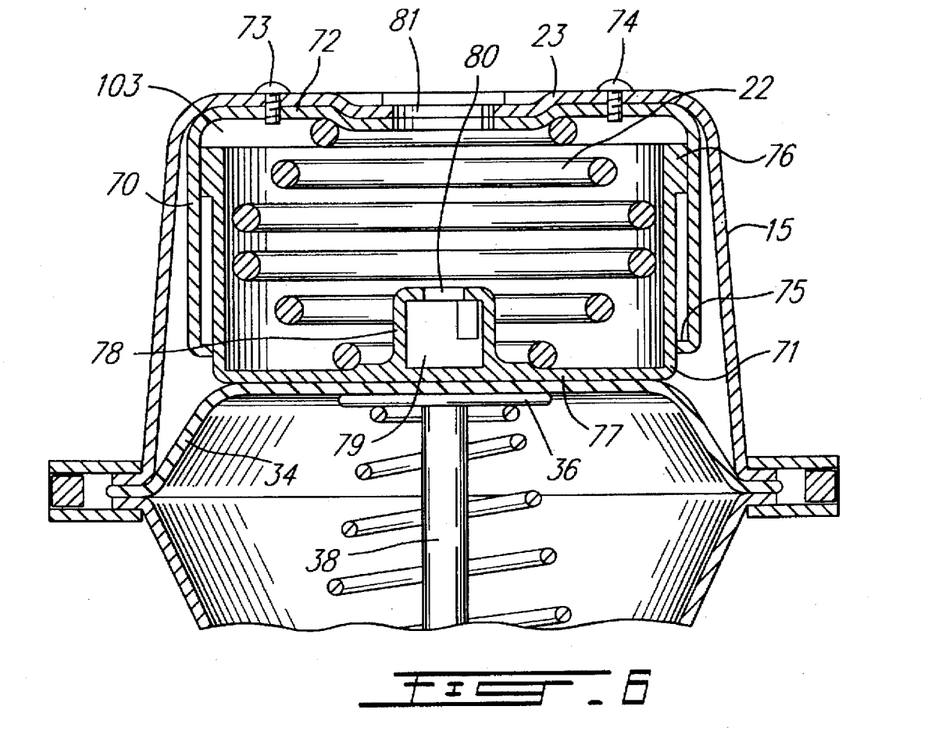
FIG. 6 is a front elevational, cross sectional view of a third embodiment of fluid-operated brake actuating mechanism according to the present invention, in which the power spring is compressed.

In the embodiment of FIG. 6, the additional wall 19 is replaced by two cup-shaped elements 70 and 71 sliding in each other.

The first cup-shaped element 70 is inverted and has a top wall 72 screwed onto the inner face of the top wall 23 of the hollow head 15 by means of screws such as 73 and 74. Cup-shaped element 70 has a lower inwardly extending annular flange 75.

The second cup-shaped element 71 has an upper, outer integral annular protuberance 76 rectangular in cross section and cooperating with the flange 75 to prevent the cup-shaped element 71 to slide downwardly out of the cup-shaped element 70. The cup-shaped element 71 has a bottom wall 77 of which the top face is formed with a cylindrical protuberance 78 to receive the lower end of the power spring 22 mounted in the cavity 103 formed by the pair of cup-shaped elements 70 and 71. The cylindrical protuberance 78 encloses a head-engaging element 79 to receive the head 59 of the draw screw 60 (FIG. 8) through a hole 80 in the top wall of the protuberance 78 and a hole 81 in the walls 23 and 72 to compress the power spring 22 as described in the foregoing description.

In the embodiment of FIG. 6, the diaphragm 34 is placed directly between the outer face of the bottom wall 77 of the cup-shaped element 71 and the push rod circular plate member 36 mounted at the upper end of the push rod 38.

Figure 7:
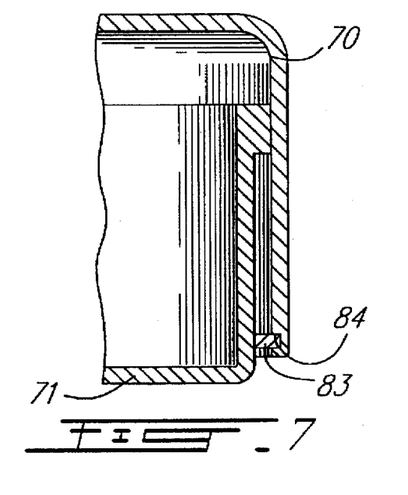
FIG. 7 illustrates a portion of the embodiment of FIG. 6 showing an alternate method for enclosing the power spring.

As illustrated in FIG. 7, the inwardly extending flange 75 can be replaced by a snap-ring 83 mounted into an annular groove 84 made in the inner surface of the cup-shaped element 70. Those of ordinary skill in the art will appreciate that the function carried out by the snap-ring 83 is exactly the same as that performed by the inwardly extending flange 75.

Figure 9:
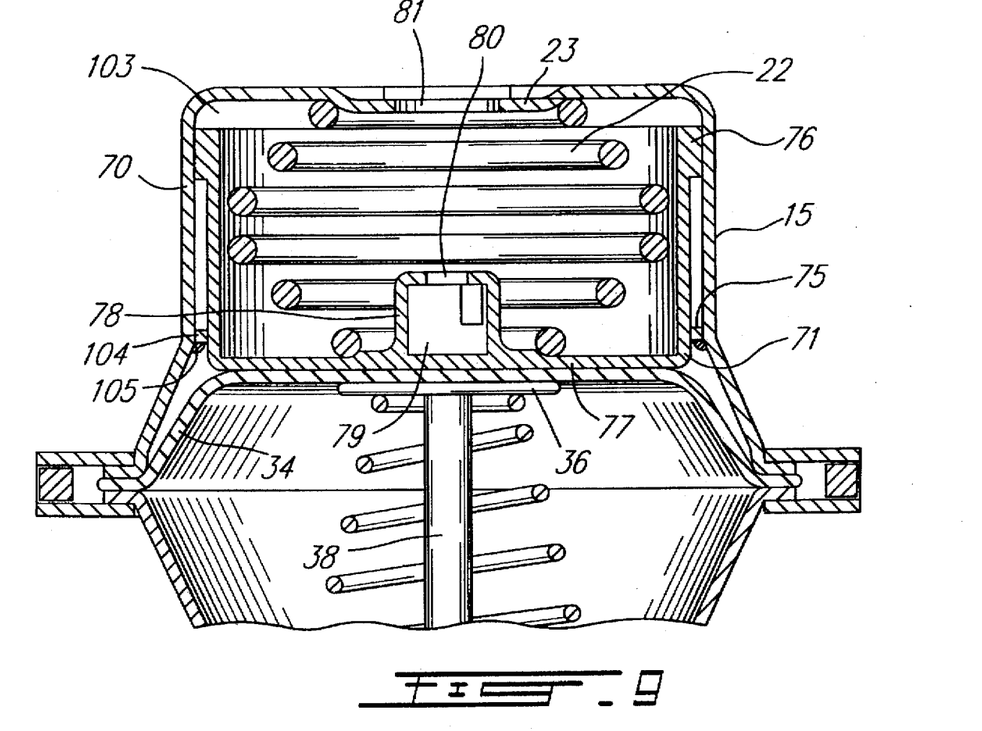
FIG. 9 is a front elevational, cross sectional view of a variant of the third embodiment of the fluid-operated brake actuating mechanism as illustrated in FIG. 6.

In FIG. 9, the hollow head 15 is configured so as to form the first cup-shaped element 70. In this embodiment, the first cup-shaped element 70 is still inverted but is integral with the hollow head 15. The inverted cup-shaped element 70 then comprises a ring 104 rectangular in cross section and welded (see 105) to the inner face of the hollow head 15 to form the lower inwardly extending annular flange 75.

Again, the upper, outer integral annular protuberance 76 of the second cup-shaped element 71 has a rectangular cross section and cooperates with the flange 75 to prevent the cup-shaped element 71 to slide downwardly out of the cup-shaped element 70. The head-engaging element 79 receives the head 59 of the draw screw 60 (FIG. 8) through the hole 80 in the top wall of the protuberance 78 and the hole 81 in the wall 23 to compress the power spring 22 as described in the foregoing description.

The diaphragm 34 is still located directly between the outer face of the bottom wall 77 of the inverted cup-shaped element 71 and the push rod circular plate member 36 mounted at the upper end of the push rod 38.

The advantage of the embodiments of FIGS. 5, 6 and 9 over the embodiment of FIGS. 1 and 2 is that they require no lengthening of the hollow head 15. However, they still limit the extension of the power spring 22 to enable easy and safe maintenance of the brake actuating mechanism 10.

Although the present invention has been described herein above by way of preferred embodiments thereof, these embodiments can be modified at will, within the scope of the appended claims, without departing from the spirit and nature of the subject invention.

What is claimed is:

1. A fluid-operated mechanism for actuating a brake, comprising:

a casing having a longitudinal axis, a first end, a second end, an inner partition wall to divide the casing into first and second coaxial chambers situated adjacent to said first and second ends, respectively, and means for opening said casing to access the first chamber;

first and second fluid-tight wall means mounted axially movable in the first and second chambers, respectively, and being spring-biased toward said first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

an inextensible power spring enclosure formed in the first chamber at said first end of the casing for containing the power spring, the power spring being confined in said inextensible power spring enclosure for limiting axial extension of the power spring upon opening of the casing to access the first chamber;

a first axially slidable member for transferring an axial force from the power spring to the first wall means or an axial force from the first wall means to the power spring;

a second axially slidable member passing through the partition wall for transferring an axial force from the first to the second wall means or an axial force from the second to the first wall means;

a fluid-tight joint mounted between the second axially slidable member and the partition wall; and a third axially slidable member passing through the second end of the casing for transmitting an axial force from the second wall means to the brake in view of actuating said brake.

2. A fluid-operated mechanism as recited in claim 1, wherein said first and second ends are upper and lower ends of the casing, and wherein the casing comprises:

an inverted cup-shaped hollow head having a top wall and a lower outwardly extending annular flange;

a flange case having said partition wall and upper and lower outwardly extending annular flanges;

a cup-shaped service housing having an upper outwardly extending annular flange and a bottom wall;

a first clamping ring for assembling the lower flange of the hollow head with the upper flange of the flange case to thereby form the first chamber, wherein the first clamping ring, the lower flange of the hollow head and the upper flange of the flange case form part of said means for opening said casing to access the first chamber; and a second clamping ring for assembling the lower flange of the flange case with the upper flange of the service housing to thereby form the second chamber.

3. A fluid-operated mechanism as recited in claim 2, wherein the power spring enclosure is formed in the first chamber by an additional wall mounted in the hollow head generally perpendicular to the longitudinal axis of the casing.

4. A fluid-operated mechanism as recited in claim 3, wherein the hollow head has an inner wall surface and wherein said additional wall has a peripheral portion welded to the inner wall surface of the hollow head.

5. A fluid-operated mechanism for actuating a brake, comprising:

a casing having a longitudinal axis, a first end, a second end, an inner partition wall to divide the casing into first and second coaxial chambers situated adjacent to said first and second ends, respectively, and means for opening said casing to access the first chamber;

first and second fluid-tight wall means mounted axially movable in the first and second chambers, respectively, and being spring-biased toward said first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

a power spring enclosure formed in the first chamber at said first end for limiting axial extension of the power spring upon opening of the casing to access the first chamber;

a first axially slidable member for transferring an axial force from the power spring to the first wall means or an axial force from the first wall means to the power spring;

a second axially slidable member passing through the partition wall for transferring an axial force from the first to the second wall means or an axial force from the second to the first wall means;

a fluid-tight joint mounted between the second axially slidable member and the partition wall; and a third axially slidable member passing through the second end of the casing for transmitting an axial force from the second wall means to the brake in view of actuating said brake; wherein said first and second ends are upper and lower ends of the casing, and wherein the casing comprises;

an inverted cup-shaped hollow head having a top wall and a lower outwardly extending annular flange;

a flange case having said partition wall and upper and lower outwardly extending annular flanges;

a cup-shaped service housing having an upper outwardly extending annular flange and a bottom wall;

a first clamping ring for assembling the lower flange of the hollow head with the upper flange of the flange case to thereby form the first chamber, wherein the first clamping ring, the lower flange of the hollow head and the upper flange of the flange case form part of said means for opening said casing to access the first chamber; and a second clamping ring for assembling the lower flange of the flange case with the upper flange of the service housing to thereby form the second chamber; and wherein:

the power spring enclosure is formed in the first chamber by an additional wall mounted in the hollow head generally perpendicular to the longitudinal axis of the casing;

the hollow head has an inner wall surface formed with a coaxial groove, and a snap-ring inserted in the coaxial groove and having an upper face; and said additional wall has a peripheral portion resting onto the upper face of the snap-ring.

6. A fluid-operated mechanism as recited in claim 5, in which said additional wall has a peripheral right angle annular corner forming a seat for said snap-ring.

7. A fluid-operated mechanism for actuating a brake, comprising:

a casing having a longitudinal axis, a first end, a second end, an inner partition wall to divide the casing into first and second coaxial chambers situated adjacent to said first and second ends, respectively, and means for opening said casing to access the first chamber;

first and second fluid-tight wall means mounted axially movable in the first and second chambers respectively, and being spring-biased toward said first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

a power spring enclosure formed in the first chamber at said first end for limiting axial extension of the power spring upon opening of the casing to access the first chamber;

a first axially slidable member for transferring an axial force from the power spring to the first wall means or an axial force from the first wall means to the power spring;

a second axially slidable member passing through the partition wall for transferring an axial force from the first to the second wall means or an axial force from the second to the first wall means;

a fluid-tight joint mounted between the second axially slidable member and the partition wall; and a third axially slidable member passing through the second end of the casing for transmitting an axial force from the second wall means to the brake in view of actuating said brake;

wherein said first and second ends are upper and lower ends of the casing, and wherein the casing comprises:

an inverted cup-shaped hollow head having a top wall and a lower annular edge surface;

an additional wall generally perpendicular to the longitudinal axis of the casing and fixedly secured to said lower annular edge surface of the hollow head to form in said hollow head the power spring enclosure, said additional wall having a peripheral portion forming an outwardly extending annular flange;

a flange case having said partition wall and upper and lower outwardly extending annular flanges;

a cup-shaped service housing having an upper outwardly extending annular flange and a bottom wall;

a first clamping ring for assembling the outwardly extending annular flange formed by the peripheral portion of said additional wall with the upper flange of the flange case to thereby form the first chamber, wherein the first clamping ring, the outwardly extending annular flange formed by the peripheral portion of said additional wall, and the upper flange of the flange case form part of said means for opening the casing to access the first chamber; and a second clamping ring for assembling the lower flange of the flange case with the upper flange of the service housing to thereby form the second chamber.

8. A fluid-operated mechanism as recited in claim 7, wherein the power spring comprises a lower end and the first axially slidable member comprises:

an axially slidable push rod passing through said additional wall and having an upper end and a lower end;

a piston mounted on the upper end of the push rod above said additional wall to receive the lower end of the power spring;

a plate member fixedly secured to the lower end of the push rod beneath said additional wall for resting onto an upper face of the first axially movable wall means.

9. A fluid-operated mechanism for actuating a brake, comprising:

a casing having a longitudinal axis, a first end, a second end, an inner partition wall to divide the casing into first and second coaxial chambers situated adjacent to said first and second ends, respectively, and means for opening said casing to access the first chamber;

first and second fluid-tight wall means mounted axially movable in the first and second chambers, respectively, and being spring-biased toward said first end;

a first port for injecting a pressurized fluid in a first cavity delimited in the first chamber between the first wall means and the partition wall, and a second port for injecting a pressurized fluid in a second cavity delimited in the second chamber between the second wall means and the partition wall;

a coaxial power spring;

a power spring enclosure formed in the first chamber at said first end for limiting axial extension of the power spring upon opening of the casing to access the first chamber;

a first axially slidable member for transferring an axial force from the power spring to the first wall means or an axial force from the first wall means to the power spring;

a second axially slidable member passing through the partition wall for transferring an axial force from the first to the second wall means or an axial force from the second to the first wall means;

a fluid-tight joint mounted between the second axially slidable member and the partition wall; and a third axially slidable member passing through the second end of the casing for transmitting an axial force from the second wall means to the brake in view of actuating said brake; wherein said first and second ends are upper and lower ends of the casing, and wherein the casing comprises:

an inverted cup-shaped hollow head having a top wall and a lower outwardly extending annular flange;

a flange case having said partition wall and upper and lower outwardly extending annular flanges;

a cup-shaped service housing having an upper outwardly extending annular flange and a bottom wall;

a first clamping ring for assembling the lower flange of the hollow head with the upper flange of the flange case to thereby form the first chamber, wherein the first clamping ring, the lower flange of the hollow head and the upper flange of the flange case form part of said means for opening said casing to access the first chamber; and a second clamping ring for assembling the lower flange of the flange case with the upper flange of the service housing to thereby form the second chamber; wherein the power spring enclosure is formed in the first chamber by an additional wall mounted in the hollow head generally perpendicular to the longitudinal axis of the casing; and wherein the power spring comprises a lower end and the first axially slidable member comprises;

an axially slidable push rod passing through said additional wall and having an upper end and a lower end;

a piston mounted on the upper end of the push rod above said additional wall to receive the lower end of the power spring;

a plate member fixedly secured to the lower end of the push rod beneath said additional wall for resting onto an upper face of the first axially movable wall means.

10. A fluid-operated mechanism for actuating a brake, comprising:

a casing having a longitudinal axis, an upper casing portion including an inverted cup-shaped hollow head having a top wall, a lower casing end, an inner partition wall to divide the casing into upper and lower coaxial chambers situated adjacent to said upper casing portion and lower casing end, respectively, and means for removing the hollow head from said casing to access the upper chamber;

upper and lower fluid-tight wall means being mounted axially movable in the upper and lower chambers, respectively, and being spring-biased toward said upper casing portion;

a first port for injecting a pressurized fluid in a first cavity delimited in the upper chamber between the upper wall means and the partition wall, and a second port for injecting a pressurized fluid in a second cavity delimited in the lower chamber between the lower wall means and the partition wall;

a power spring unit comprising a coaxial power spring, an upper inverted cup-shaped power spring enclosure portion having a top wall and a lower annular end, and a lower non inverted cup-shaped power spring enclosure portion having an upper annular end, wherein (a) the top wall of said upper enclosure portion is removably fastened to a lower face of the top wall of the hollow head for removably mounting the upper enclosure portion in the upper chamber of the casing, (b) said lower enclosure portion is mounted onto the upper enclosure portion to axially slide onto said upper enclosure portion between a retracted position and an extended position, (c) said lower and upper annular ends comprise means for restricting axial movement of the lower enclosure portion on the upper enclosure portion between said retracted and extended positions, (d) said upper and lower enclosure portions define an extensible power spring enclosure, (e) said power spring is confined in said extensible power spring enclosure for limiting axial extension of the power spring upon opening of the casing to axial extension of the lower enclosure portion, and (f) said lower enclosure portion constitutes a first axially slidable member for transferring an axial force from the power spring to the upper wall means or an axial force from the upper wall means to the power spring;

a second axially slidable member passing through the inner partition wall for transferring an axial force from the upper to the lower wall means or an axial force from the lower to the upper wall means;

a fluid-tight joint between the second axially slidable member and the partition wall; and a third axially slidable member passing through the lower casing end of the casing for transmitting an axial force from the lower wall means to the brake in view of actuating said brake.

11. A fluid-operated mechanism as recited in claim 10, wherein the casing comprises:

the inverted cup-shaped hollow head further having a lower outwardly extending annular flange;

a flange case having said partition wall and upper and lower outwardly extending annular flanges;

a cup-shaped service housing having an upper outwardly extending annular flange and a bottom wall;

a first clamping ring for assembling the lower flange of the hollow head with the upper flange of the flange case to thereby form the upper chamber, wherein the first clamping ring, the lower flange of the hollow head and the upper flange of the flange case form part of said means for removing the hollow head from said casing to access the upper chamber; and a second clamping ring for assembling the lower flange of the flange case with the upper flange of the service housing to thereby form the lower chamber.

12. A fluid-operated mechanism as recited in claim 11, wherein the lower enclosure portion is mounted onto other; and the upper enclosureportion to axially slide into said upper enclosure portion.

13. A fluid-operated mechanism as recited in claim 12, wherein:

the power spring comprises an upper end and a lower end; and the lower enclosure portion constituting said first axially slidable member has a bottom wall having an upper face for receiving the lower end of the power spring and a bottom face resting on an upper face of the upper wall means.

14. A fluid-operated mechanism as recited in claim 10 wherein said means for restricting axial movement of the lower enclosure portion on the upper enclosure portion comprises:

the annular end of one of said upper and lower enclosure portions formed with an inwardly extending annular flange; and the annular end of the other of said upper and lower enclosure portions formed with an outer annular protuberance cooperating with the inwardly extending annular flange for limiting sliding movement of said lower enclosure portion on the upper enclosure portion.

* * * * *